United States Patent [19]

Loladze et al.

[11] Patent Number: 4,901,477
[45] Date of Patent: Feb. 20, 1990

[54] APPARATUS FOR ABRASIVE MACHINING

[76] Inventors: Teimuraz N. Loladze, ulitsa Lenina, 75, kv. 33; Boris I. Batiashvili, prospekt Vazha Pshavela, 77, kv. 134; David S. Bulskhrikidze Dabigh Thilish Tbilisi, prospekt mera kv. 24 Gennady L. Mamulashvili, ulitsa Oktyabrskaya, 263, kv. 35, all of Tbilisi, U.S.S.R.

[21] Appl. No.: 283,272
[22] PCT Filed: Mar. 3, 1988
[86] PCT No.: PCT/SU88/00050
 § 371 Date: Nov. 7, 1988
 § 102(e) Date: Nov. 7, 1988
[87] PCT Pub. No.: WO88/06950
 PCT Pub. Date: Sep. 22, 1988

[30] Foreign Application Priority Data

Mar. 10, 1987 [SU] U.S.S.R. .......................... 4201398/08

[51] Int. Cl.⁴ .............................................. B24B 7/00
[52] U.S. Cl. .................................... 51/109 R; 51/168; 51/131.4
[58] Field of Search ................. 51/168, 109 R, 209 R, 51/209 DL, 131.3, 131.4, 132, 134.5, 111 R, 112

[56] References Cited

U.S. PATENT DOCUMENTS 2,315,511 10/1940 Elberty .......................... 51/134.5 R
3,731,436 5/1973 Krafft ............................. 51/209 DL Primary Examiner—D. S. Meislin
Assistant Examiner—Bruce Watson
Attorney, Agent, or Firm—Fleit, Jacobson, Cohn, Price, Holman & Stern

[57] ABSTRACT

An apparatus for abrasive machining has an annular support (1) and a faceplate (5) which is operatively connected to a drive and is mounted on a thrust bearing (2) for rotation in a radial bearing (8). According to the invention, the faceplate (5) has a coaxial bushing (7) journalled in the radial bearing (8), and the faceplate (5) and the annular support (1) are elastically coupled to each other by means of an axle (9) extending through the bushing (7) and biased by a spring in the direction of preload in the thrust bearing (2), the faceplate (5) being connected to the axle (9) for rotation relative thereto by an auxiliary thrust bearing (12) and having on the outer cylindrical periphery thereof a driven member of the drive, a plane (17) drawn through the middle of width of the driven member (16) of the drive extending through a plane (18) drawn substantially through the middle of width of the radial bearing (8).

4 Claims, 3 Drawing Sheets

APPARATUS FOR ABRASIVE MACHINING

FIELD OF THE ART

The invention relates to the mechanical engineering, and in particular, it deals with apparatuses for abrasive machining.

STATE OF THE ART

Known in the art is a machine tool for abrasive machining (U.S. Pat. No. 2,963,830) comprising a bed, an abrasive wheel mounted on a faceplate which is mounted on a drive shaft. The drive shaft is journalled in a casing supported by the bed by means of radial-thrust antifriction bearings. Rotation to the abrasive wheel is imparted by a drive through the drive shaft and the faceplate. A workhead mounted on the bed develops a force pressing the work to an end face of the abrasive wheel.

This force directed perpendicularly with respect to the end face of the abrasive wheel gives rise to a moment with respect to the bearings and causes deformation of the drive shaft, faceplate and abrasive wheel so that high dimensional accuracy of the working surface of the tool, hence high accuracy of machining cannot be achieved. In addition, as the drive shaft is journalled by means of radial-thrust bearings, vibrations of the abrasive wheel occur because of a limited accuracy of such bearings and plays therein thus also lowering accuracy of machining.

Known in the art is an apparatus for grinding workpieces (GB, A, No. 2124114) comprising a bed having an annular support which carries a faceplate mounted by means of a thrust bearing for supporting workpieces, a drive shaft being rigidly and coaxially secured to the faceplate and journalled in a radial bearing mounted in the annular support of the bed. The faceplate is rotated by a drive through a gearing and the drive shaft. A driven gear of the drive shaft is rigidly secured to its lower end, and forces are applied to its upper end face through piston rods of power cylinders equally spaced along circumference of the gear thereby ensuring a preload in the thrust bearing.

Radial and axial forces are developed in this machine, in the meshing zone of the gears to give rise to a tilting moment acting in the axial section of the drive shaft to deform the drive shaft which tends to lift the faceplate from the thrust bearing thereby disrupting uniformity of distribution of the preload in the thrust bearing and causing its non-uniform wear. This results in a loss of smoothness of rotation and occurrence of vibrations to lower accuracy of machining with time. In addition, a minor disruption of equality of forces provided by the power cylinders gives rise to additional moments acting in various sections of the drive shaft thereby resulting in a further increase in the tilting moment applied to the faceplate, hence in an increase in negative phenomena that do not allow machining at high speeds to be carried out.

An apparatus for abrasive machining of planar surfaces (SU,A, No. 1104762) free of these of these disadvantages comprises a bed supporting a workhead and an annular support. The annular support carries, by means of a thrust bearing, a faceplate which is rotated by means of a coaxial drive shaft rigidly secured thereto, the upper end of the shaft being journalled in an antifriction bearing mounted in the annular support, the lower end of the shaft being connected by means of a clutch to a stub shaft of a driven member of a drive, which is journalled in antifriction bearings mounted in a casing supported by the bed.

The apparatus also comprises an adjustable means for pressing the faceplate against the annular support which is in the form of an air-powered diaphragm having its casing secured to the bed.

This prior art apparatus makes it possible to ensure a more uniform load distribution at the thrust bearing because radial forces developed in the drive are eliminated and also owing to the coaxial arrangement of the air-powered diaphragm with respect to the drive shaft so that no tilting moments are generated in the axial planes. However, as the faceplate is pressed against the annular support through steps of the thrust bearing with a certain force, an increased runout of the lower end of the drive shaft occurs with a substantial length of the drive shaft so that a non-uniform load is applied to the steps during rotation to result in non-uniform wear of both the steps of the thrust bearing and the bearing faces of the faceplate which, in the end of the day, results in a lower accuracy of machining. In addition, the machine tool design is complicated, and the air-powered diaphragm and the driven member assembly supported by the bed have substantial axial size so as to compromise rigidly of structures and result in a large metal weight of the apparatus for abrasive machining.

DISCLOSURE OF THE INVENTION

The invention is based on the problem of providing an apparatus for abrasive machining having such a construction which ensures high accuracy of machining owing to enhanced rigidity and provision of uniform pressure of the faceplate against the annular support to ensure uniform wear of steps of the thrust bearings and bearing faces of the faceplate, while also simplifying the structure, reducing axial size and lowering metal weight.

This problem is solved by that in an apparatus for abrasive machining, comprising an annular support carving a thrust bearing and a faceplate carrying an abrasive tool, operatively connected to a drive and mounted on a thrust bearing for rotation in a radial bearing provided inside the annular support, according to the invention, the faceplate has a coaxial bushing provided on its inner end face and journalled in a radial bearing, and the faceplate and annular support are elastically connected to each other by means of an axle having a shoulder at one end thereof and a threaded portion and a nut at the other end thereof, the axle extending through the bushing and a central hole of the annular support and being biased by a spring in the direction of preload of the thrust bearing, the faceplate being coupled to the axle for rotation relative thereto by means of an auxiliary thrust bearing and having a driven member of the drive on the outer cylindrical periphery thereof, a plane drawn through the middle of width of the driven member of the drive extending in a plane drawn substantially through the middle of width of the radial bearing.

The provision of the faceplate journalled in the radial bearing by means of the coaxial bushing and the provision of the drive member of the drive on the outer cylindrical periphery of the faceplate make it possible to achieve a substantial reduction of the axial size of the apparatus.

As the driven member of the drive is positioned with respect to the radial bearing in such a manner that planes drawn through the middle of their widths substantially coincide with each other, no tilting moments that might be developed because of radial forces generated by the drive can occur so as to achieve uniform load at the thrust bearing.

The elastic coupling between the faceplate and annular support makes up for tilting moments and wear of the thrust bearing occurring during operation of the apparatus.

It is preferred that the thrust bearing be located in an axial bore in the outer end face of the faceplate, between the shoulder and the bore bottom.

This arrangement makes it possible to position the working face of the grinding wheel closer to the outer end face of the faceplate thereby reducing tilting moment causing by radial forces occurring during machining.

The axle may be biased by a spring in the direction of preload in the trust bearing by means of an annular elastic member mounted on the axle between the nut and the annular support, the auxiliary thrust bearing being mounted coaxially with the faceplate, on the bore bottom.

This arrangement allows centering of the axle with respect to the faceplate to be ensured by means of the auxiliary thrust bearing.

In a preferred embodiment of the invention, the axle is loaded by a spring in the direction of preload in the thrust bearing by means of an annular elastic member provided between the auxiliary trust bearing and the bore bottom.

This construction ensures a further reduction of the axial size of the apparatus.

Therefore, an apparatus for abrasive machining according to the invention ensures a rather high accuracy of abasive machining while lowering metal weight.

BRIEF DESCRIPTION OF THE DRAWINGS

These and other features and advantages of the invention will become apparent from the following description of specific embodiments thereof with reference to the accompanying drawings, in which.

PREFERRED EMBODIMENTS OF THE INVENTION

Figure 1:
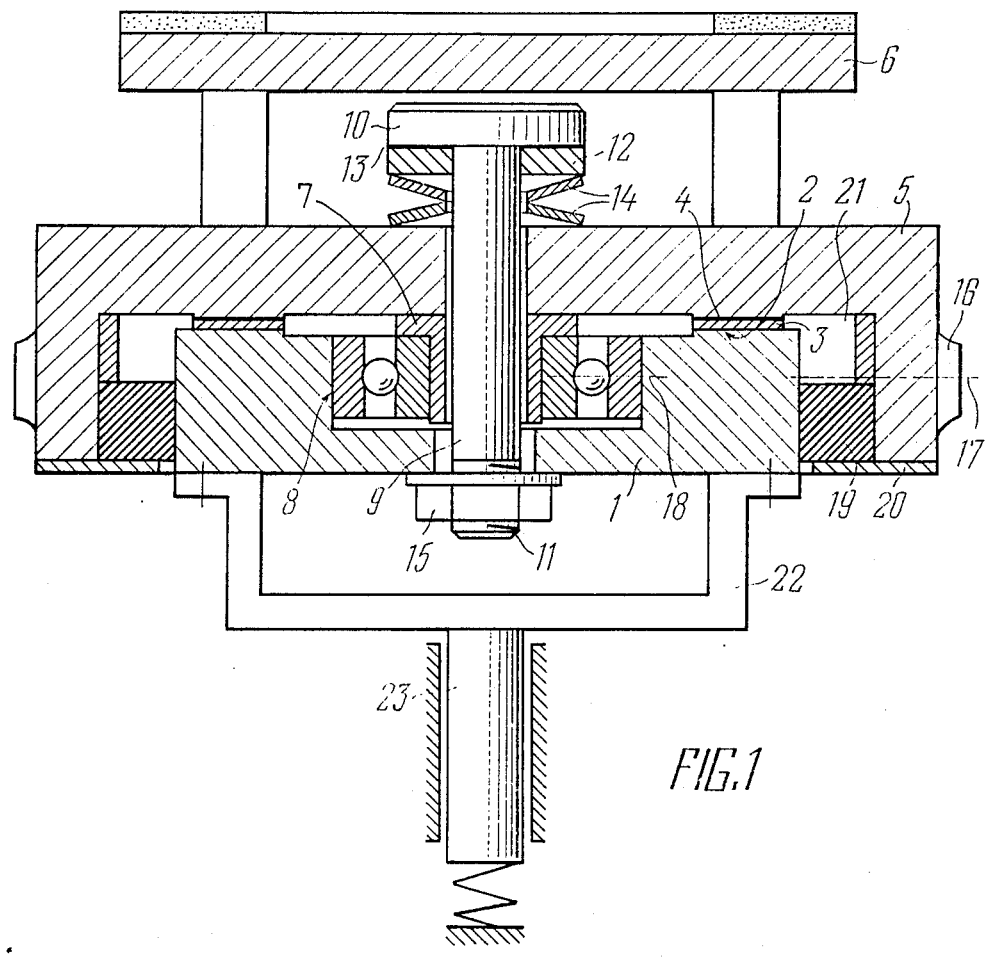
FIG. 1 schematically shows a longitudinal section of an apparatus according to the invention.

An apparatus for abrasive machining according to the invention shown in FIG. 1 comprises an annular support 1 carrying a sliding-contact thrust bearing 2 having its steps 3 provided with an antifriction coating 4. The thrust bearing 2 supports a faceplate 5 carrying an abrasive tool 6. A coaxial bushing 7 is rigidly secured to an inner end face of the faceplate 5 for rotation in a radial bearing 8. The radial bearing 8 in mounted in the annular support 1. An axle 9 extends through the coaxial bushing 7 and has an upper end (in the drawing) provided with a shoulder 10 and a lower end having a threaded portion 11. The shoulder 10 bears against an auxiliary sliding-contact thrust bearing 12 having an antifriction coating 13 which, in turn, bears through the intermediary of Belville springs 14 against an outer end face of the faceplate 5. A pressure nut 15 is put on the threaded portion 11 of the axle 9 to provide a preload in the thrust bearing 2. The cylindrical periphery of the faceplate 5 has a toothing 16 of a drive gear, the toothing 16 being provided in such a manner that a plane 17 drawn through the middle of its width extends in a plane 18 drawn substantially through the middle of width of the radial bearing 8.

A seal 19 is provided between the outer cylindrical periphery of the annular support 1 and the outer cylindrical periphery of the faceplate 5 and is closed by a lid 20 secured to the faceplate 5. The seal 19 prevents lubricant of the steps 3 of the thrust bearing 2 from leaking from an interior space 21 of the faceplate 5. During operation of the apparatus according to the invention, which is turned upside down, the seal 19 may be dispensed with.

The annular support 1 is rigidly secured to a flange 22 of a tail spindle 23 mounted in a casing (not shown) for axial movement.

Figure 2:
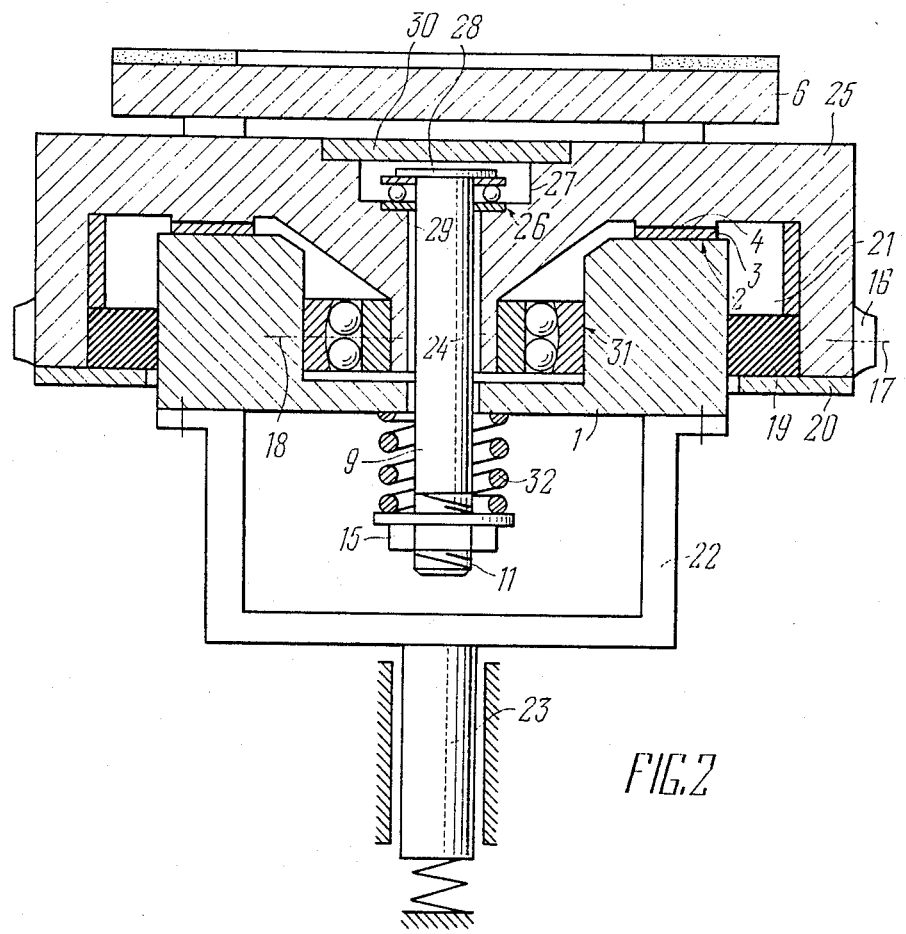
FIG. 2 is a longitudinal section of another embodiment of an apparatus according to the invention in which an auxiliary thrust bearing is provided in an axial bore of an outer end face of a faceplate and an elastic member is in the form of a helical spring.
Figure 3:
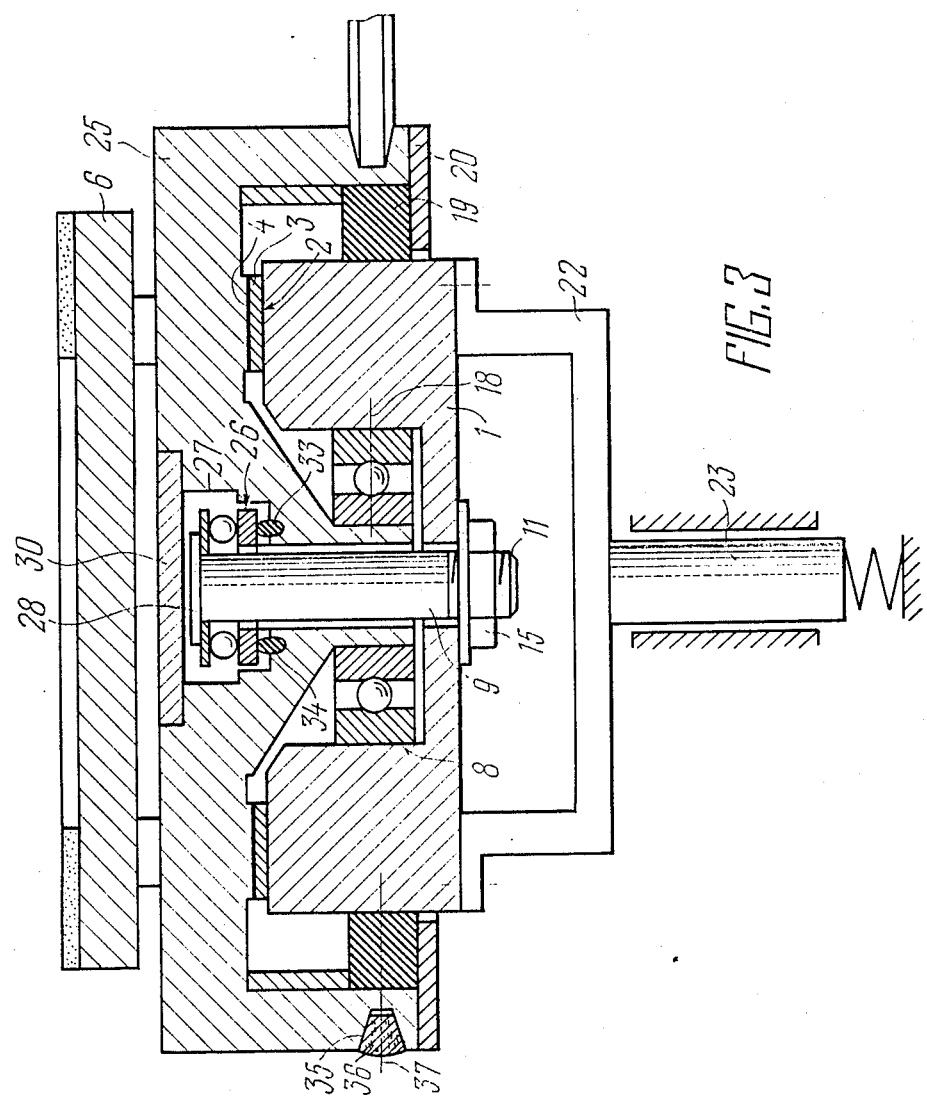
FIG. 3 is a longitudinal section of a further embodiment of an apparatus according to the invention, in which an annular elastic member is provided between the auxiliary thrust bearing and the bore bottom.

In the embodiment shown in FIG. 2, the apparatus is similar to that described above, with the only difference that a coaxial bushing 24 is integral with a faceplate, an auxiliary thrust bearing 26 is an antifriction bearing and is provided in an axial bore 27, between a shoulder 28 and a bottom of the axial bore 27, the bearing being mounted in a centering counterbore 29. The axial bore 27 is covered by an end plate 30. The coaxial bushing 24 of the faceplate 25 is journalled in a double-row radial-thrust ball bearing 31 provided in the annular support 1. The axle 9 is biased by means of an annular elastic member which is in the form of a helical compression spring 32 mounted on the axle 9 between the pressure nut 15 and the annular support 1.

In another embodiment of an apparatus according to the invention, the annular elastic member is in the form of a rubber ring 33 provided between the auxiliary thrust bearing 26 and the bottom of the axial bore 27 of the faceplate 25, in an annular groove 34 made in the bottom of the axial bore 27 coaxially with the hole of the bushing 24. A wedge-shaped groove 35 is provided in the outer cylindrical periphery of the faceplate 5 which is the groove defining a driven pulley of a belt 36 of a V-belt transmission and which is made in such a manner that a plane 37 drawn through the middle of its width extends in the plane 18 drawn substantially through the middle of width of the radial bearing 8.

The apparatus for abrasive machining according to the invention functions in the following manner.

Before starting machining, the pressure nut 15 (FIG. 1) bearing against the annular support 1 is tightened on the thread 11 of the axle 9. The axle 9 is thus caused to move axially and to press with its shoulder 10 against the auxiliary thrust bearing 12 which acts upon the faceplate 5 through the Belville spring 14 thereby providing a preload in the thrust bearing 2. The force of this preload in chosen in such a manner as to eliminate all plays in the thrust bearing 2 as well as all plays occurring as a result of wear of the thrust bearing 2. The faceplate is meanwhile slowly rotated so as to check up for elimination of the play by means of a dial gauge (not shown).

When the preload is provided in the thrust bearing 2, the abrasive tool 6 is mounted on the faceplate 5 (or a holder containing workpieces) (the holder is now shown).

The faceplate 5 is rotated by means of a drive (not shown) through the toothing 16. Radial forces developed under the action of the drive and radial forces at the abrasive tool 6 as a result of machining of workpieces are taken up by the radial being 8. The radial forces occurring in the mesh of the drive and acting upon the driven members thereof are balanced by reaction forces in the radial bearing 8 and do not give rise to tilting moments that might have lifted the faceplate 5 from the thrust bearing 2 since resultant forces of both forces are in one and the same plane.

Feeding of the apparatus according to the invention during abrasive machining is effected by axially moving the tail spindle 23.

The embodiment of the apparatus according to the invention shown in FIG. 2 functions in a similar manner.

At the same time, when oscillations of the axle 9 occur because of inaccuracies of manufacture of the axle 9 and faceplate 25, the axle 9 cannot engage the bushing 24 or annular support 1, which might have been the cause of non-uniform load at the thrust bearing, owing to the centering of the axle 9 in the faceplate 25 by means of the auxiliary thrust bearing 26 provided in the centering counterbore 29 of the axial bore 27 and owing to the cooperation between the pressure nut 15 mounted on the thread 11 of the axle 9 with the annular support 1 through the intermediary of the helical spring 32. In addition, an eventual out-of-squareness of the bearing face of the faceplate 5 with respect to the cylindrical surfaces of the bushing 24 is made up for by the double-row radial-thrust ball bearing 31.

Another embodiment of the apparatus according to the invention functions as described above. In this case oscillations of the axle 9 in the radial direction are absorbed by the rubber ring 33.

INDUSTRIAL APPLICABILITY

The invention may be most effectively used for precision grinding, polishing and lapping of planar faces of works, especially such as piezo-quartz resonators, supports for microchips, throw-away hard metal inserts, cermet materials and other compositions materials and jewelry.

An apparatus for abrasive machining of planar faces of workpieces according to the invention may also be used as precision spindle or worktable for carrying out other cutting purposes involving application of thrust.

We claim:

1. An apparatus for abrasive machining comprising an annular support (1) carrying a thrust bearing (2) and a faceplate (5;25) operatively connected to a drive and carrying an abrasive tool (6), the faceplate being mounted by means of the thrust bearing (2) for rotation in a radial bearing (8;31) provided inside the annular support (1), characterized in that the faceplate (5;25) has a coaxial bushing (7;24) provided on its inner end face and journalled in the radial bearing (8;31), and in that the faceplate (5;25) and the annular support (1) are elastically coupled to each other by means of an axle (9) having a shoulder (10;28) at one end thereof and a threaded portion (11) and a nut (15) at the other end thereof, the axle extending through the bushing (7;24) and a central hole of the annular support (1) and being spring-biased in the direction of preload in the thrust bearing (2), the faceplate (5;25) being connected to the axle (9) for rotation relative thereto by means of an auxiliary thrust bearing (12;26) and having a driven member (16;36) of the drive on the outer cylindrical periphery thereof, a plane (17;37) drawn through the middle of width of the driven member extending in a plane (18) drawn substantially through the middle of width of the radial bearing (8).

2. An apparatus according to claim 1, characterized in that the auxiliary thrust bearing (26) is provided in an axial bore (27) of an outer end face of the faceplate (25), between a shoulder (28) of the axle (9) and bottom of the bore (27).

3. An apparatus according to claim 2, characterized in that the axle (9) is biased in the direction of preload in the thrust bearing (2) by means of an annular elastic member (32) mounted on the axle (9) between the nut (15) and the annular support (1), the auxiliary thrust bearing (26) being mounted coaxially with the faceplate (25) on the bottom of the bore (27).

4. An apparatus according to claim 2, characterized in that the axle (9) is biased in the direction of preload in the thrust bearing (2) by means of an annular elastic member (33) mounted coaxially with the faceplate (25) between the auxiliary thrust bearing (26) and the bottom of the bore (27).

* * * * *